July 8, 1969  G. E. NEUMAN  3,453,808
APPARATUS FOR REMOVING PARTICLES FROM GASES
Filed May 8, 1967
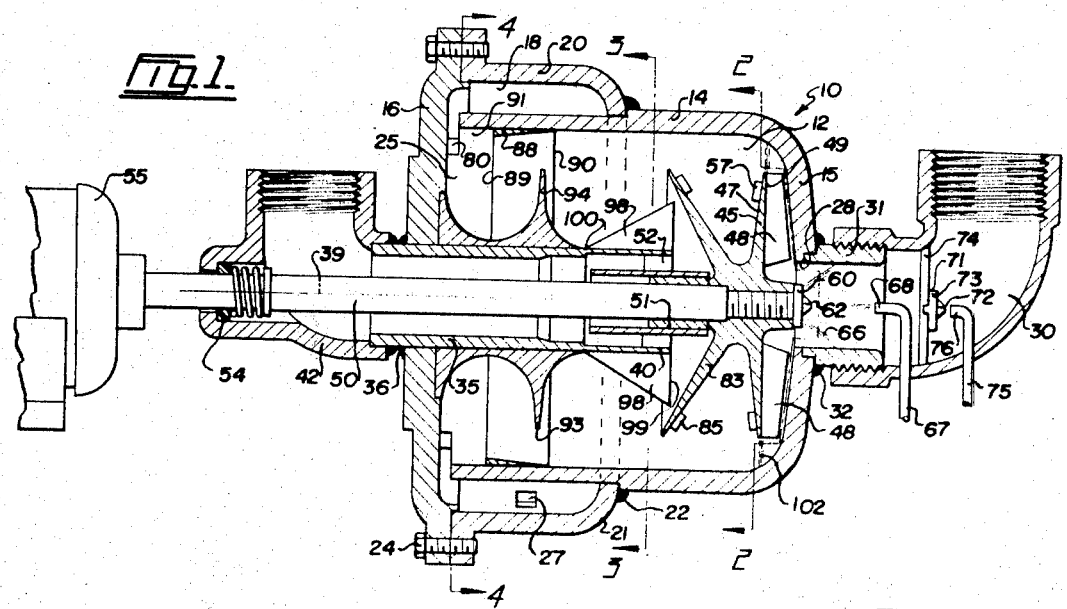
Fig.1.
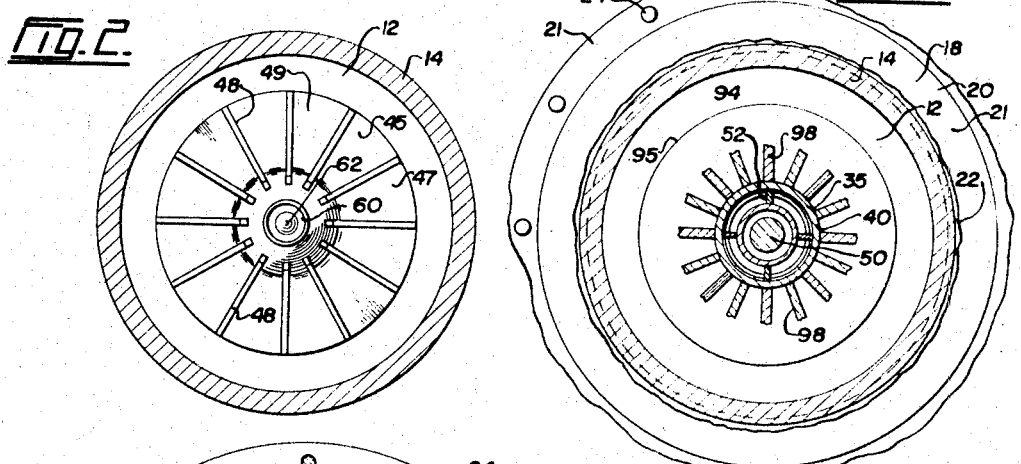
Fig.2.  Fig.3.
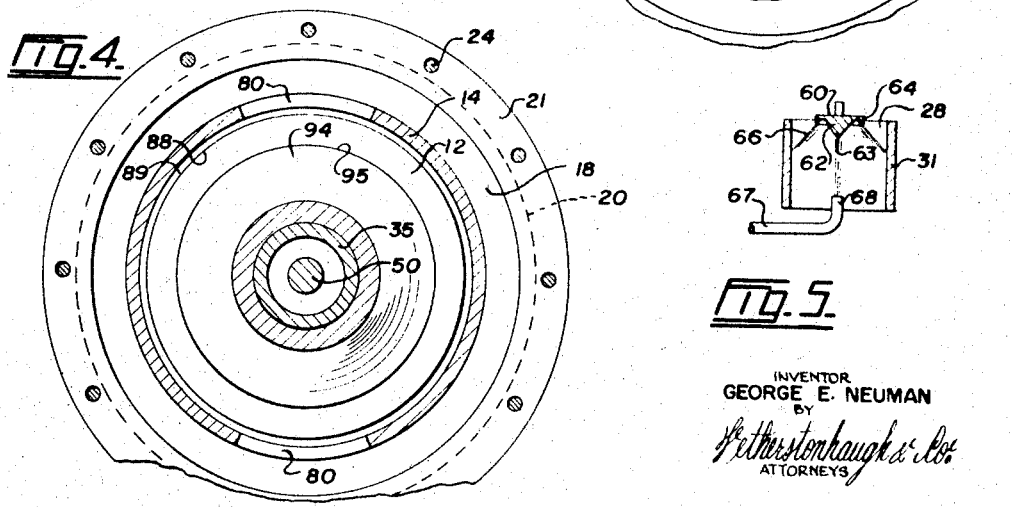
Fig.4.
Fig.5.
INVENTOR
GEORGE E. NEUMAN
BY
Featherstonhaugh & Co.
ATTORNEYS

United States Patent Office 3,453,808
Patented July 8, 1969

3,453,808
APPARATUS FOR REMOVING PARTICLES FROM GASES
George E. Neuman, deceased, late of South Burnaby, British Columbia, Canada, by Adeline S. Neuman, administratrix, 5640 Nelson Ave., South Burnaby, British Columbia, Canada
Filed May 8, 1967, Ser. No. 637,013
Claims priority, application Canada, Dec. 5, 1966, 977,080
Int. Cl. B01d 47/18, 47/06
U.S. Cl. 55—220                    1 Claim

ABSTRACT OF THE DISCLOSURE

Apparatus having a chamber into which gases with particles therein are directed at one end thereof, means for imparting to the gases rotary motion to cause the separation of the particles by centrifugal action, the particles being removed from the chamber around the wall thereof at the end remote from the entrance end of the chamber, and the gases being removed from the chamber centrally thereof.

Background of the invention

This invention relates to apparatus for removing particles from gases.

There are many devices in the prior art for removing particles from gases, but these have to be relatively large, and even then it is very difficult to get the gases through them while making the separation in accordance with the speed with which the gases are generated. Many gases contain particles that should be removed therefrom before the gases are discharged to atmosphere, to prevent pollution of the atmosphere and/or to save the particles. Smoke from furnaces contain carbon and other solid particles, smoke from steel furnaces includes iron oxide in it, air being removed from grain elevators contains particles, as does air being removed from grinding and buffing rooms. In many cases, the gases are just discharged to atmosphere with the resulting pollution and/or loss, primarily because the prior art separators are too expensive, or too large, or too slow in operation. There are many devices on the market for removing carbon and other solids from smoke, but these are usually very large, cumbersome and expensive.

The present apparatus is very simple and economical in design, and removes particles from gas at such a speed that the gas travels through it without any great reduction in the velocity thereof, and yet the gas is thoroughly cleansed of the particles. Another advantage of this apparatus is that it is quite small and compact compared to the volume of gas it can handle in a given time.

Summary of the invention

Apparatus according to the present invention comprises a separating chamber having a substantially cylindrical wall with first and second end walls at opposite ends thereof, inlet means for delivering gas with particles therein through an entrance in the first wall, and opening means in the cylindrical wall near the second end wall. A diffuser button is mounted in the inlet means centrally thereof, and means is provided for directing a stream of liquid under pressure against this button, which is shaped to atomize the liquid and to direct it in a thin spray across the path of travel of the gas to dampen the particles therein. Rotary motion imparting means is located in the chamber near the first wall thereof to cause the particle laden gas to spiral away from the latter wall near and along the cylindrical wall. During this time, the moistened particles, under the action of centrifugal force, move away from the chamber axis to the cylindrical wall and along the latter to and through said opening means. Outlet means is provided in the chamber near the central axis thereof and the rotary motion imparting means and extends out of the chamber. With this arrangement, the gas containing particles is directed continuously through a thin spray of atomized liquid to dampen the particles therein, these particles being separated from the gas in the separating chamber when the rotary motion is imparted to the gases. The moisture-laden particles travel along the wall of the chamber, while the cleaned gas is directed towards the axial centre of the chamber and back towards the rotary motion imparting means. The gas is then directed out of the chamber through the outlet means.

Brief description of the drawings

FIGURE 1 is a longitudinal section through a preferred form of this apparatus,

FIGURE 2 is a section taken on the line 2—2 of FIGURE 1,

FIGURE 3 is a section taken on the line 3—3 of FIGURE 1,

FIGURE 4 is a section taken on the line 4—4 of FIGURE 1, and

FIGURE 5 is an enlarged diagrammatic view of a diffuser button of the apparatus, illustrating the atomized action thereof.

Description of the preferred embodiment

Referring to the drawings, the particle separating or removing apparatus 10 according to the present invention includes a separating chamber 12 having a substantially cylindrical wall 14 with first and second end walls 15 and 16 at opposite ends thereof. In this example, end wall 15 is integrally connected to cylindrical wall 14, while end wall 16 is removably secured to said cylindrical wall. End wall 16 may be directly connected to wall 14, or as shown, it is removably connected to a closed tank 18 which surrounds wall 15 near the end thereof to which wall 16 is connected. In this example, tank 18 consists of an annular wall 20 surrounding and spaced outwardly from chamber wall 14. A flange 21 connected to one edge of annular wall 20 extends inwardly therefrom and is secured to chamber wall 14 in any suitable manner, such as by welding, as indicated at 22 in FIGURE 1. End wall 16 is made large enough to overlap annular wall 20, and these walls are interconnected in any suitable manner, such as by means of bolts 24. When in place, end wall 16 preferably bears against the adjacent end of cylindrical wall 14 at 25. Tank 18 has an outlet 27 formed in annular wall 20. Although apparatus 10 is shown lying in a horizontal position, it will be understood that it may be positioned vertically, in which case, end wall 15 becomes the bottom of chamber 12, and end wall 16 a cover therefor.

An opening or entrance 28 is formed in wall 15 centrally thereof, and a suitable inlet means or passage is provided for directing gases to and through said entrance. In this case, an inlet pipe 30 forms the confining wall of said passage and extends to and directs gases through entrance 28, said pipe being connected to end wall 15 in any suitable manner. In this example, pipe 30 is in the form of an elbow screwed on to a nipple 31 which is connected to wall 15, in any suitable manner, such as by welding 32.

Outlet means is provided for chamber 12. This outlet means is preferably in the form of an outlet pipe 35 which extends through end wall 16 centrally thereof and is secured thereto in any suitable maner, such as by welding 36. Pipe 35 extends along the longitudinal central axis 39 of chamber 12, and has an open inner end 40 which is spaced from but near end wall 15. The outer or opposite end of pipe 35 is connected to an elbow 42.

Suitable means is provided in chamber 12 near wall 15 for imparting a rotary motion to gases directed into the chamber through entrance 28. Although this can be done in different ways, it is preferable to provide an impeller 45 for this purpose. The impeller comprises a disc 47 extending parallel to but spaced from end wall 15 and having a plurality of radiating blades 48 on its surface 49 which faces wall 15, said blades just clearing the wall, as shown in FIGURE 1. Impeller 45 is fixedly mounted on the end of a shaft 50 which extends longitudinally through outlet pipe 35. This shaft is journalled in a bearing 51 in pipe 35 and located near pipe end 40 and held in spaced relation to the inner surface of said pipe by a plurality of spaced webs 52. The outer end of pipe 35 is closed by a seal 54 through which shaft rotatably extends, said shaft being connected to a suitable source of power, such as an electric motor 55. If desired, a plurality of short radiating blades 57 may be mounted on the surface of disc 47 opposite its surface 49.

A diffuser button 60 is mounted on impeller 45 and extends into entrance 28 and faces inlet pipe 30. This diffuser button includes a conical protuberance 62 and is inclined radially outwardly, the apex 63 of which extends towards inlet pipe 30. An annular rim 64 is provided on button 60 and surounds protuberance 62. This rim is shaped to spray liquid which is directed against the apex of protuberance 62 across the passage formed by inlet pipe 30 in a thin spray curtain and preferably angled in a upstream direction, as indicated at 66 FIGURES 1 and 5. A suitable liquid, such as water, is directed against the apex 63 of the diffuser button by a pipe 67 which extends into inlet pipe 30, said pipe 67 having an end 68 which extends towards but is spaced from the diffuser button.

A stationary diffuser button 71 can be provided in inlet pipe 30 in addition to or in place of rotary diffuser button 60. Button 71 is the same as button 60, and has a conical protuberance 72 and an annular rim 73. Button 71 is mounted in any suitable manner, such as on a bar 74 extending across inlet pipe 30. A pipe 75 extends into inlet pipe 30, and said pipe has an end 76 extending towards but spaced from the apex of the conical protuberance of button 71. Water or other suitable liquid is directed by pipe 75 on to the stationary diffuser button.

Opening means is provided in cylindrical wall 14 adjacent end wall 16. This opening means is in the form of a plurality of openings or notches 80 formed in the end of cylindrical wall 14 adjacent end wall 16, said openings or notches bringing chamber 12 into communication with the interior of tank 18. Instead of a plurality of openings 80, the end of wall 14 can terminate a little short of wall 16.

A cup-shaped deflector 83 is mounted on impeller 45 between the latter and outlet end 40 of pipe 35. This deflector extends towards but terminates short of the inner surface of annual wall 14 of chamber 12, as does disc 47 of impeller 45. The rim of the deflector is substantially in line with pipe end 40. If desired, short radiating blades 85 may be mounted on the surface of deflector 83 facing impeller 45.

Although not absolutely necessary, it is preferable to provide a choke ring 88 on the inner surface of wall 14 adjacent but spaced a little from openings 80. This ring is wedge-shaped in cross section, as clearly shown in FIGURE 1, with the thick edge 89 thereof near openings 80, and the thin edge 90 facing end wall 15. The thick edge 89 of the choke ring forms a low pressure area 91 between it and openings 80.

The apparatus is further improved by a deflector 94 mounted on and radiating from outlet pipe 35 between pipe end 40 and outlets 80. This deflector is usually about midway between the pipe end and the openings, and it has a rim 95 spaced from the inner surface of cylindrical wall 14.

It is preferred to provide means for stopping gas in chamber 12 from spiralling around outlet pipe 35 near said pipe and its open end 40, and for this purpose, a plurality of spaced vanes 98 are mounted on and radiate from pipe 35 near its end 40, said vanes extending longitudinally of chamber 12. Each vane 98 is relatively wide at its end 99 adjacent pipe end 40 and preferably narrows down to substantially a point 100 at its opposite end.

The operation of apparatus 10 is relatively simple. Gas containing particles, such as smoke with carbon and other particles therein, is directed by inlet pipe 30 through entrance 28 into separating chamber 12. Pipe 67 directs liquid under pressure against diffuser button 60 which atomizes the liquid and directs it in a thin spray curtain across the passage formed by pipe 30. This diffuser button rotates at high speed, and the water is broken down into a very fine spray. The particle-laden gas travels through this fine spray so that the particles, even the fiinest of them, are moistened so that their respective weights are increased. The gas on entering chamber 12 is given a rotary motion by blades 48 of impeller 45 and is directed under the action of centrifugal force outwardly against cylindrical wall 14. As a result of this action, the gas travels in a spiral path along or near wall 14 to and through choke ring 88. As the gas clears the thick edge 89 of the ring, the particles and water therein move under the action of centrifugal force into low pressure area 91 and then travel out of the separating chamber through openings 80 into tank 18. These particles and the water are removed from the tank through outlet 27. The lighter gas engages end wall 16 and is deflected thereby back towards end wall 15 of the chamber along the central axis thereof or, in other words, along the outer surface of outlet pipe 35. Deflector 94, if used, directs this gas generally towards chamber wall 14 so that any particles remaining therein will travel towards said wall and be caught in the mainstream of the gas moving along said wall towards end wall 16. The lighter gas travels around rim 95 of deflector 94 and back towards outlet pipe 35. This gas is still moving spirally within chamber 12, and if vanes 98 are provided, as preferred, these vanes tend to stop this swirling action, and the gas travels into open end 40 of outlet pipe 35, along said pipe and out through elbow 42. If vanes 98 are omitted, the spinning gas tends to create a low pressure area at pipe end 40 which tends to resist the flow of gas into the outlet pipe. Vanes 98 prevent this tendency.

During operation of the apparatus, the gas travelling through chamber entrance 28 takes liquid with it, and this comes into contact with surface 49 of disc 47. The spinning disc throws this water outwardly in a fine spray 102, and the gas has to travel through this spray before it can move along the surface of cylindrical wall 14. Spinning deflector 83 prevents any of the gas near end wall 15 from travelling directly to the open end of outlet pipe 35, and any gas that tends to move in this direction is directed back towards the chamber wall by the outer conical surface of the deflector, said deflector also imparting a spiralling motion to this gas.

The second diffuser button 71 is useful at any time, but it is particularly useful if very large quantities of gas are being forced through the apparatus. Button 71 functions in the same manner as button 60, although it does not create quite as fine a spray since it is not rotating. For some purposes, diffuser button 60 may be omitted and button 71 only used.

Apparatus 10 is particularly useful for removing particles from gases without interfering with the normal flow of these gases. The diffuser button arrangement of the apparatus causes all the particles to be dampened so that it is easier to separate the particles from the gas under the action of centrifugal force than would otherwise be the case. The very fine spray clings to the smallest of particles to increase the weight thereof in order to increase the differential between the particle and the gas.

What is claimed is:

1. Apparatus for removing particles from gases, comprising a separating chamber comprising a substantially cylindrical wall having a longitudinal axis and first and second end walls at opposite ends of said cylindrical wall, an entrance in and centrally of said first wall, an inlet passage formed by a confining wall communicating with said entrance for directing gas with particles therein to and through the entrance, a radial outlet for liquid in the cylindrical wall near said second end wall, a diffuser button mounted in said inlet passage centrally thereof, spray means positioned opposite the diffuser button for directing a stream of liquid under pressure longitudinally of said passage and against said diffuser button, said diffuser button comprising means, including a conical protuberance having an apex, against which the stream is directed, which extends in a direction away from said entrance and upstream relative to gas flowing through the inlet passage, and an inclined annular rim surrounding said protuberance and extending upstream for atomizing said liquid and for directing said atomized liquid upstream in a thin spray curtain angularly across the path of travel of the gas in the inlet passage to the confining wall of the passage so that all gas passes through said curtain and all particles therein are dampened, a gas outlet pipe extending through said second end wall co-axially with the longitudinal axis of the chamber and including an open end, an impeller member located in the chamber near said first end wall for imparting to the gas entering the chamber a rotary motion around a central axis thereof to cause the particle laden gas to spiral away from said first end wall and near and along the cylindrical wall, the rotation of the gas in the chamber causing the moistened particles under the action of centrifugal force to move away from the chamber axis to the cylindrical wall and along the cylindrical wall to and through said radial outlet in the cylindrical wall, said member comprising a flat disc member perpendicular to the longitudinal axis of the chamber, a plurality of blades extending from the front face of said disc member and facing upstream, and a conical member which extends from the rear face of said disc member covering and spaced from the inlet to said gas outlet pipe, spaced vanes radiating from the outer wall of said outlet pipe for slowing down the rotary motion of the gas moving centrally of the chamber towards said open end of the outlet pipe, and motor means for driving said impeller member.

References Cited

UNITED STATES PATENTS

| | | | |
|---|---|---|---|
| 1,564,346 | 12/1925 | Green | 55—261 |
| 3,171,807 | 3/1965 | Neuman | 210—512 |
| 3,276,189 | 10/1966 | Sylvan | 55—235 |
| 3,323,290 | 6/1967 | Stern | 55—238 |
| 1,858,724 | 5/1932 | Armstrong | 261—115 |
| 2,136,476 | 11/1938 | Thomas | 55—393 |
| 2,195,707 | 4/1940 | Nutting | 210—512 |
| 2,530,002 | 11/1950 | Coy | 261—111 |
| 3,188,007 | 6/1965 | Myklebust | 55—230 |
| 3,191,364 | 6/1965 | Sylvan | 55—401 |
| 3,276,592 | 10/1966 | Neuman | 55—230 |

HARRY B. THORNTON, *Primary Examiner.*

B. NOZICK, *Assistant Examiner.*

U.S. Cl. X.R.

55—230, 406, 416; 209—211; 210—512; 261—90, 111